United States Patent

[11] 3,569,602

| [72] | Inventor | Stanley Norem |
| | | Bayside, N.Y. |
| [21] | Appl. No. | 839,276 |
| [22] | Filed | July 7, 1969 |
| [45] | Patented | Mar. 9, 1971 |
| [73] | Assignee | The Perkin-Elmer Corporation |
| | | Norwalk, Conn. |

[54] TEMPERATURE PROGRAMMING APPARATUS WITH A HEATING SENSING ARRANGEMENT
10 Claims, 5 Drawing Figs.

[52] U.S. Cl.................................................. 13/24,
73/15, 73/362, 219/425, 219/439, 219/494, 219/530
[51] Int. Cl.............................................. H05b 3/62
[50] Field of Search........................................ 73/15, 16,
362 (R), 285; 219/425, 2, 4, 439—440, 441—2,
490, 494, 530, 540; 13/25, 31, 24

[56] References Cited
UNITED STATES PATENTS

| 2,710,886 | 6/1955 | Randall........................ | 13/24 |
| 2,825,222 | 3/1958 | Stone........................... | 73/15 |
| 2,932,718 | 4/1960 | Marsters....................... | 219/530X |
| 3,086,385 | 4/1963 | Branchereau et al......... | 219/425X |
| 3,128,326 | 4/1964 | Hintenberger................ | 13/31 |
| 3,299,196 | 1/1967 | Lasch, Jr., et al............ | 13/24 |

Primary Examiner—Volodymyr Y. Mayewsky
Attorney—Edward R. Hyde, Jr

ABSTRACT: An apparatus for varying the temperature of a material over a range of temperatures in a programmed manner includes an electric furnace which is heated both by a heater element which exhibits a relatively nonlinear resistance-temperature characteristic and a linearizing electrical impedance coupled to the element to provide a relatively linear resultant resistance-temperature characteristic. The heating element and linearizing impedance are positioned with respect to the furnace for transferring to the furnace thermal energy created by the dissipation of electrical energy therein.

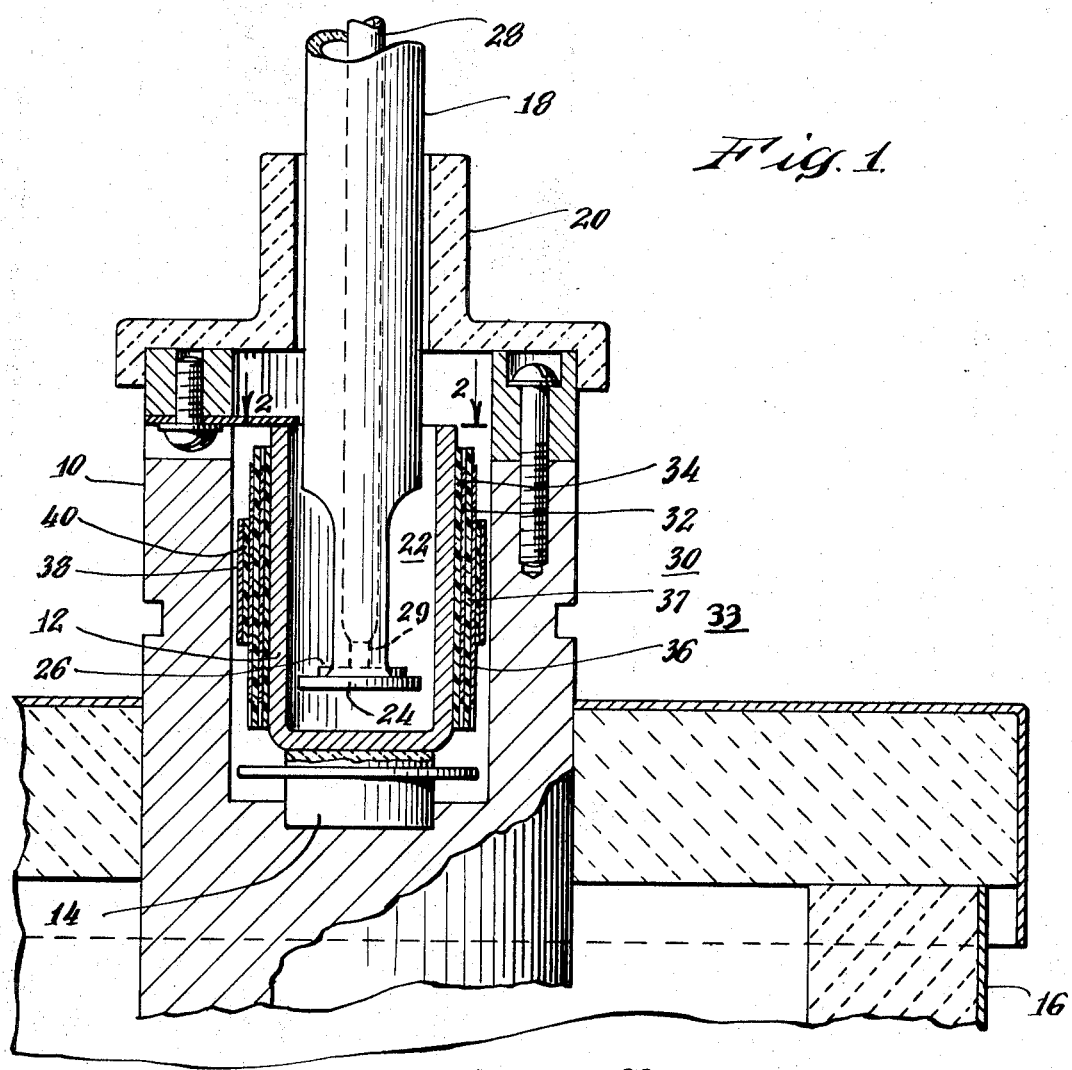
Fig. 1.
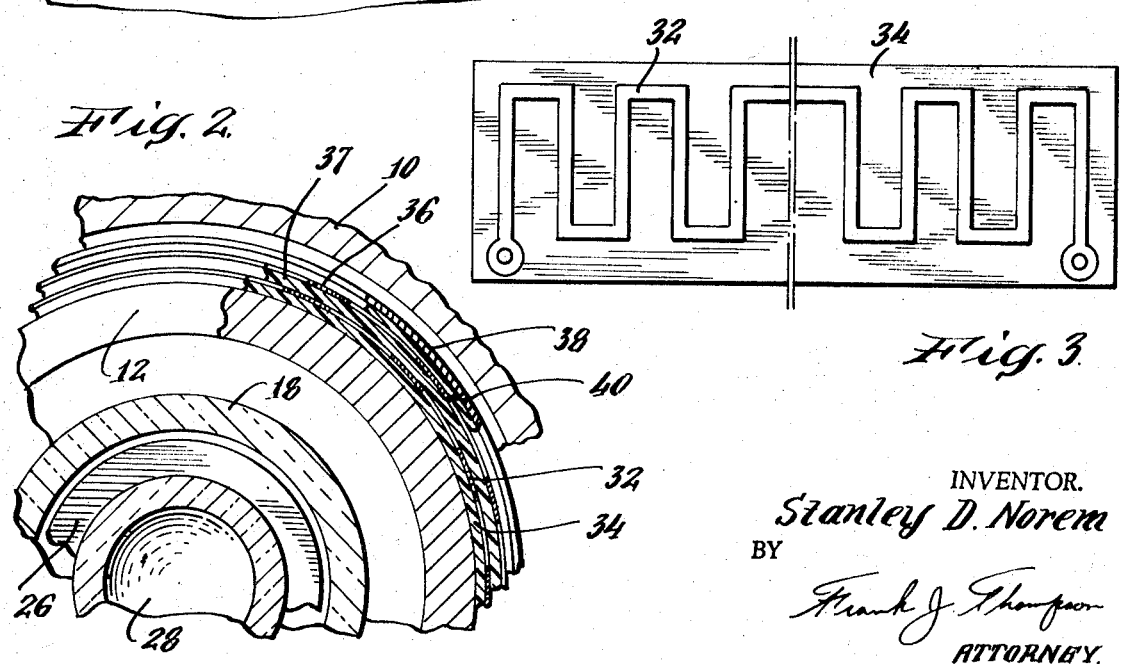
Fig. 2.
Fig. 3.
INVENTOR.
Stanley D. Norem
BY
Frank J. Thompson
ATTORNEY.

INVENTOR.
Stanley D. Norem
BY
Frank J. Thompson
ATTORNEY.

TEMPERATURE PROGRAMMING APPARATUS WITH A HEATING SENSING ARRANGEMENT

This invention relates to apparatus adapted for exchanging thermal energy with a material over a range of temperatures in a predetermined manner. The invention relates more particularly to an improved arrangement for increasing the linearity of operation of this apparatus.

It is often desirable to vary the temperature of a material over a range of temperatures in a predetermined manner. For example, in various analytical apparatus such as a scanning calorimeter, a thermal gravimetric analysis instrument and a thermomechanical analysis instrument, the temperature of a sample is varied in a programmed manner and alterations in physical characteristics which accompany the variations in temperature of the sample material are sensed and recorded.

A prior apparatus of this type has included an electric furnace for heating the sample over the desired range. An electric coil is formed about an outer surface of a thermally conductive furnace material and electrical energy is supplied to the coils for heating the furnace. In addition to coupling thermal energy to the furnace body, the heating element also functions as a temperature sensing element. Circuit means are provided for alternately applying electrical energy to this element for heating the furnace, and, for sensing the resistance thereof to provide an electrical indication of sample temperature. This electrical indication is utilized to control the application of heating energy to the element in accordance with the desired program. A single element heating and sensing arrangement of this type is described and claimed in copending U.S. Pat. application Ser. No. 673,040 filed Oct. 5, 1967, and which is assigned to the assignee of the present invention.

It is desirable to provide a heating element for this use which can both be fabricated economically and which is reproducible with a relatively high degree of accuracy. It is further desirable to provide a relatively large and substantially linear temperature coefficient of resistance for the element. Prior heater arrangements have included a platinum element which exhibits an acceptable substantially linear temperature coefficient. However, in addition to the relatively high cost of platinum the fabrication of a heater from this material is relatively expensive since it does not lend itself readily to certain manufacturing techniques such as the formation of the heating element by the etching of a metal foil on an insulative printed circuit support board. On the other hand, other heater materials such as nickel which are most suitable for a variety of fabrication techniques and are substantially less costly exhibit a temperature coefficient having a linearity which is unacceptable particularly at the higher temperatures for the precision requirements of analytical instruments. In prior arrangements, the linearity of these other materials which could be employed as heating elements has been enhanced by shunting the heating element with a resistive linearizing impedance having a relatively high power rating and a substantially zero coefficient of resistance. The linearity provided by this arrangement of heating element and shunt is satisfactory for use in analytical instruments. In order to obtain this linearity however the shunt draws a relatively large current and dissipates a relatively large amount of electrical energy. The use of a power dissipating impedance has been considered to be unsuitable for use in an analytical analysis apparatus in view of the inefficient use of relatively large magnitudes of electrical power and the requirements for locating and cooling the power dissipating element in the apparatus.

Accordingly, it is an object of this invention to provide an improved apparatus for programming a material over a range of temperatures.

Another object of the invention is to provide in an apparatus for temperature programming a material over a range of temperatures, an improved heater arrangement having a heater element exhibiting a relatively nonlinear resistance temperature characteristic and a linearizing element.

Another object of this invention is to provide an improved single-element heater and sensor in a temperature programming arrangement for an analytical instrument wherein the element is fabricated of a material having a resistance-temperature characteristic in an analytical instrument.

A further object of the invention is to provide a single-element heater sensor temperature programming arrangement for an analytical instrument having a heater element formed of a material exhibiting a relatively nonlinear resistance-temperature characteristic and a linearizing element and wherein electrical energy dissipated in the linearizing element is efficiently utilized.

Another object of the invention is to provide a single-element temperature programming arrangement for an analytical instrument having a heating element formed of a material exhibiting a relatively nonlinear resistance-temperature characteristic and a linearizing element and wherein the energy dissipated in the linearizing element is efficiently utilized for heating the sample under analysis.

In accordance with the general features of the present invention, an apparatus for varying the temperature of a material over a range of temperatures in a programmed manner includes an electrical furnace which is heated both by an element exhibiting a relatively nonlinear resistance-temperature characteristic and a linearizing electrical impedance. The linearizing impedance has a relative low resistance temperature coefficient and is coupled to the heating element for providing a relatively linear resultant resistance-temperature characteristic. The heating element and linearizing impedance are positioned with respect to the furnace for transferring to the furnace thermal energy created by the dissipation of electrical energy therein.

In accordance with more particular features of the invention, a heater and sensing element is fabricated of a material, such as nickel, which is relatively inexpensive and which exhibits a relatively nonlinear resistance-temperature characteristic. This element is positioned about a furnace for transferring thermal energy thereto. A linearizing impedance having a relatively low resistance-temperature coefficient is coupled in shunt with the heater-sensing element and is positioned about the furnace for transferring to the furnace thermal energy created by the dissipation of electrical energy in this impedance. Circuit means are provided for alternately applying electrical heating energy to the heater-sensing element and linearizing impedance for sensing the impedance thereof thereby providing an electrical signal representative of the temperature of the sample. The circuit means utilizes the electrical signal for controlling the application of thermal energy to the heater element in a programmed manner.

These and other object and features of the invention will be apparent with reference to the following specifications and the drawings wherein:

FIG. 1 is an elevation view, partly in section, illustrating a furnace constructed in accordance with an embodiment of the present invention;

FIG. 2 is an enlarged partial sectional view taken along line 2—2 of FIG. 1;

FIG. 3 is a planar view of the heating and linearizing element of FIG. 1 formed by printed circuit techniques prior to positioning about the furnace of FIG. 1;

Figure 4:
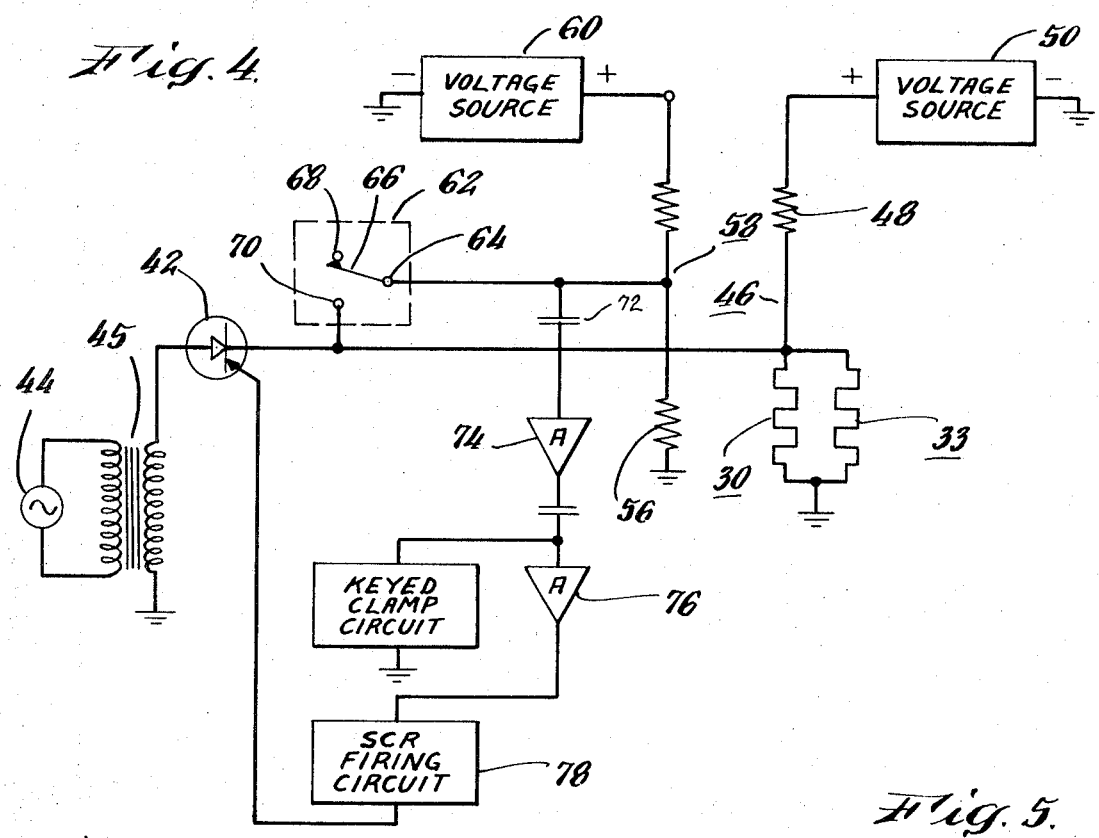
Figure 5:
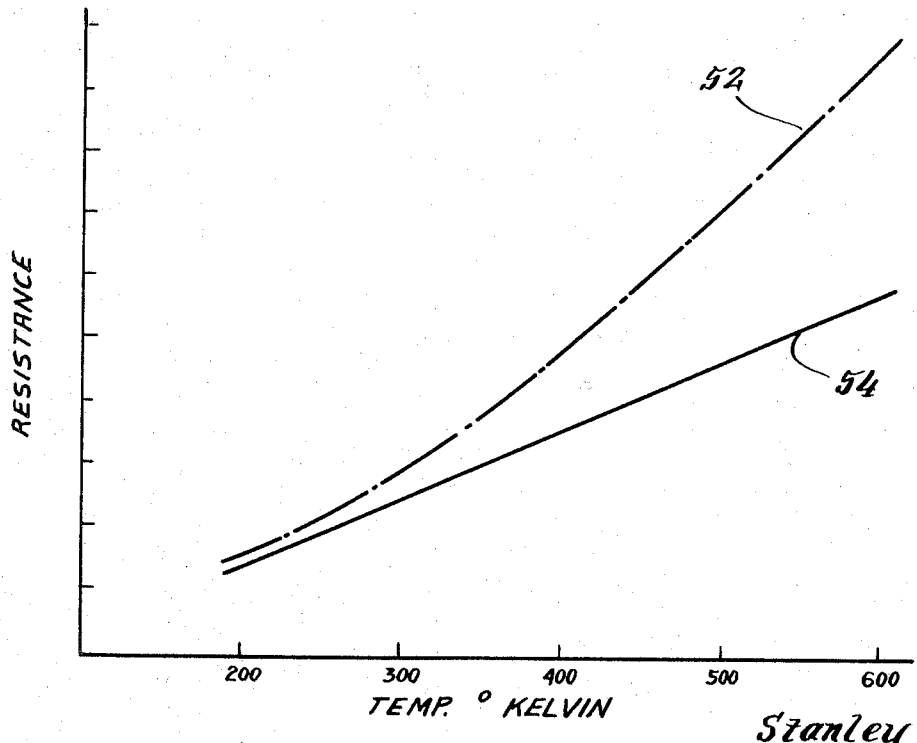

FIG. 4 is a circuit diagram partly in block form, illustrating an arrangement for applying which is energy to the sample material in a programmed manner in accordance with the present invention; and FIG. 5 is a diagram illustrating the improvement in the linearity of the resistance temperature characteristic of combined heater and linearizing element with respect to the characteristic of the heater-sensor element taken alone.

Referring now to FIG. 1, an aluminum heat sink 10 a thermomechanical analysis apparatus is shown to enclose a cylindrical shaped aluminum furnace 12 which is supported within the heat sink by an insulated spacer 14 formed of alumina ceramic, for example. This assembly is positioned within a Dewar flask 16 and a tubular quartz sample support holder 18 extends through an asbestos cap 20 into a chamber 22 of the furnace. The sample holder includes a sample support surface 24 on which a sample material 26 which is to be temperature programmed over a range of temperatures is positioned. A quartz tube probe 28 for sensing thermomechanical variations in the properties of the sample 26 is provided and a solid tip 29 thereof is positioned on the surface of the sample 26. A thermomechanical analysis apparatus of this type is described and claimed in copending U.S. Pat. application, (A-819) Ser. No. 839,285, filed Jul. 7, 1969, and which is assigned to the assignee of the present invention.

The furnace 12 is heated in a programmed manner by a heating and sensing element 30 which comprises a wire formed of a metal foil 32 and which is positioned on an insulated support body 34. In FIG. 3, the element 30 is illustrated in a planar configuration as the electrically conductive foil 32 which is etched on the insulated body 34 in accordance with conventional printed circuit fabrication techniques. The conductive foil 32 is selected for characteristics contributing to economy and reproducibility of manufacture. A particular example of a material from which the element 30 is fabricated is nickel. The insulated body 34 is formed from Kapton for example. The dimensions of the insulating board and the foil are selected for providing that the insulator 34 may be deformed into a cylindrical shape about the cylindrically shaped aluminum furnace 12 while providing both electrical insulation and a thermal conductivity efficient for heating the furnace. The foil 32 has a thickness and width sufficient for dissipating electrical energy for heating the furnace.

The materials having the desired manufacturing characteristics from which the heater-sensing coil 30 of FIG. 1 can be fabricated generally exhibit relatively nonlinear resistance-temperature characteristics, particularly at the higher temperatures to which a sample material would be programmed. In accordance with a feature of this invention a linearizing impedance 33 is positioned with respect to the furnace 12 for applying thermal energy thereto and is coupled electrically to the heater-sensor element in order to provide a composite impedance which exhibits a resultant resistance-temperature characteristic. The linearizing impedance 33 comprises a metal foil 36 fabricated in substantially the same manner as the heater-sensor element through the etching of a conductive material on an insulated support body 37. A suitable material from which the linearizing element is formed for use with a nickel heater-sensor element is Nichrome V. The insulated support body 37 formed into a cylinder and positioned about the heater-sensor element 30. The heater-sensor and linearizing elements are then secured in position about the furnace body by a metal clip 38 which is insulated electrically and thermally from the linearizing impedance by a thin strip of insulating material 40 such as Kapton.

The heater-sensor element 30 functions to both transfer thermal energy to the furnace 12 for heating the sample 26 and for sensing the temperature of the furnace. A circuit means is illustrated in FIG. 4 for alternately applying electrical energy to the heater-sensor and linearizing element during one portion of a temperature programming cycle, and, for sensing the resultant impedance of the heater-sensor and linearizing elements during another portion of the cycle. During the sensing portion of the cycle an electrical signal is provided which is representative of the temperature of the furnace. The circuit means controls the application of energy to these elements in a programmed manner in accordance with this signal. The parallel coupled elements 30 and 33 are shown coupled to a silicon controlled rectifier 42. Electrical energy for heating the elements is derived from an alternating current source 44 and is coupled to the heating element via a transformer 45 and the SCR 42. The elements 30 and 33 are also series coupled in a voltage divider circuit 46 with a resistive impedance 48 and a source of DC potential 50. A DC sensing current flows in this series circuit and establishes a voltage drop across these elements. This voltage drop varies in amplitude in accordance with the resultant resistance of the element 30 and the parallel coupled linearizing element 33. As the elements 30 and 33 increase in temperature, the composite impedance increases accordingly. The element 33 exhibits substantially zero temperature coefficient of resistance and as the element increase in temperature, the resultant parallel resistance of these elements will increase in a substantially linear manner. The curve 52 of FIG. 5 is illustrative of the nonlinearity of a nickel heater element, while the curve 54 illustrates the composite characteristic of the resultant impedance provided when the heater is shunted by a linearizing impedance 32 having a resistance of 5.6 times the resistance of the nickel element 30 at 0° C. The voltage drop across this resultant impedance will therefor be linearly related to the temperature of this impedance and will be a relatively accurate indication of the furnace temperature.

A desired setpoint temperature to which the sample is to be heated is provided by a voltage drop across a resistive impedance 56 of the voltage divider 58. Setpoint voltage is established by an output control voltage applied to this voltage divider from a source 60. This put output control voltage comprises a DC voltage or a DC voltage which varies slowly in amplitude in a predetermined manner over a period of time. In the latter case, the voltage source 60 represents a conventional programmed output voltage as is generally found in present day analytical instruments.

A circuit means for generating an alternating voltage having an amplitude proportional to a difference in the amplitudes of the setpoint voltage and the voltage drop across the resultant impedance of the elements 30 and 33 includes a chopper 62 of the electromechanical or electronic type. In FIG. 4 the chopper 62 comprises a conventional electromechanical vibrator and for purposes of clarifying the drawing only the chopper contacts of particular interest are shown. A terminal 64 of a chopper swinger arm 66 is coupled to the voltage divider 58. The swinger arm 66 is periodically switched between a terminal 68 and an unused terminal 70 at a 60-cycle rate, for example. Electrical heating energy is applied to the elements 30 and 33 during that part of the cycle when the swinger arm 66 makes contact with terminal 68. More particularly, the swinger arm 66 is timed to break contact with terminal 70 before heating energy is applied to the elements 30 and 33, and to make contact during that portion of the cycle after the application of heater energy has been terminated. An output impedance of the voltage divider 46 is substantially less than an output impedance of the voltage divider 58. The relatively low impedance divider 46 is primarily determinative of the voltage at terminals 64 and 70 when the swinger arm 66 contacts terminal 70. The voltage drop across the elements 30 and 33 will then appear at terminal 64 as the swinger makes contact with the terminal 70. When the swinger breaks contact with terminal 70 and contacts terminal 68, the low impedance network 46 is decoupled from terminal 64 and the setpoint voltage appears at terminal 64. By periodically making and breaking contact with terminal 70 a DC voltage having an alternating component which is representative of the difference in amplitude between the setpoint voltage and the voltage drop across the elements 30 and 33 is thereby generated. A capacitor 72 couples this voltage to an amplifier 74 and an alternating voltage representative of the voltage difference between the setpoint and the voltage across the elements 30 and 33 is thus provided.

This alternating voltage is amplified by the amplifying stage 74 and is coupled via a DC amplifier 76 to an SCR control circuit 78. Heating power is then applied to the elements 30 and 33 in accordance with the amplitude of the AC output signal from the amplifier 74. The firing circuit 78 affects an amplitude-to-phase conversion for controlling the conduction of the SCR and the application of heater energy. As the temperature of the elements 30 and 33 approaches the setpoint temperature, the AC signal output from the amplifier 74 decreases in amplitude toward zero volts. The feedback loop then provides for the automatic application of sufficient power to the elements 30 and 33 for maintaining the setpoint temperature. This circuit arrangement is described in greater detail in the referred to copending application, Ser. No. 673,000.

Thus, there has been described an improved heating arrangement in a temperature programming apparatus wherein a heating element which can be fabricated with relative economy and with a high degree of reproducibility is provided and a resistance temperature characteristic of the element is rendered substantially more linear through the use of a linearizing impedance wherein thermal energy created by the flow of electrical energy therein is applied to a furnace for the efficient utilization of energy.

While I have illustrated and described a particular embodiment of my invention, it will be understood that various modifications may be made therein without departing from the spirit of the invention and the scope of the appended claims.

I claim:

1. In an apparatus adapted for varying the temperature of a material over a range of temperatures and including an electric furnace having an electrical heating element positioned with respect to the furnace for applying energy to the furnace for heating a material positioned therein, and a circuit means coupled to said heating element for applying electrical heating energy thereto, the improvement comprising, an electrical linearizing element coupled to said heating element and to said circuit means for increasing the linearity of a resistance-temperature characteristic thereof, said linearizing element positioned with respect to said furnace for applying to said furnace thermal energy created by the dissipation of electrical energy in said linearizing element for thereby heating the material positioned in the furnace.

2. The apparatus of claim 1 wherein said linearizing element is coupled in parallel with said heating element.

3. The apparatus of claim 1 wherein said circuit means is arranged for alternately applying electrical energy to said heating element and to said linearizing element and for sensing the resistance of said elements and providing an electrical signal indicative of the temperature of said furnace.

4. In an analytical instrument adapted for varying the temperature of a sample material under analysis over a programmed range of temperatures and for providing an indication of the occurrence of a variation of a characteristic of a sample material, said instrument having an electric furnace including an electrical heating element positioned for applying thermal energy to said furnace when a current flows in said element, said element having a nonlinear resistance-temperature characteristic, a circuit means coupled to said heating element for varying the sample material temperature by alternately applying electrical energy thereto for heating said element and for sensing the impedance of said element and providing an electrical indication representative of the temperature of said furnace, the improvement comprising an electrical linearizing element coupled in parallel circuit with said heating element and to said circuit means and positioned with respect to said furnace for coupling thermal energy to said furnace resulting from the dissipation of electrical energy in said linearizing element.

5. The instrument of claim 4 wherein said heating element is positioned about an outer surface of said furnace.

6. The instrument of claim 5 wherein said linearizing element is positioned about an outer surface of said furnace.

7. The instrument of claim 6 wherein said heating element is formed by a wire foil disposed on a first insulating support body which is formed about the outer surface of said furnace and said linearizing element is formed of a wire foil positioned on a second insulating support body which is formed about an outer surface of said furnace.

8. The instrument of claim 7 wherein said heating element is formed of nickel.

9. The instrument of claim 8 wherein said linearizing element is formed of Nichrome V.

10. The instrument of claim 4 wherein said linearizing element has a resistance-temperature coefficient of resistance which is substantially zero.